United States Patent
Vlock

[11] Patent Number: 5,083,442
[45] Date of Patent: Jan. 28, 1992

[54] REFRIGERATOR WITH PURIFIED WATER SUPPLY

[76] Inventor: Mary Vlock, 185 West End Ave., New York, N.Y. 10023

[21] Appl. No.: 640,188
[22] Filed: Jan. 11, 1991
[51] Int. Cl.⁵ ............................................. F25D 23/12
[52] U.S. Cl. ........................................ 62/338; 210/206; 210/257.2; 210/266; 210/295; 210/321.6
[58] Field of Search ................ 62/338, 339, 389, 78; 210/257.2, 746, 754, 206, 266, 295, 321.6

[56] References Cited

U.S. PATENT DOCUMENTS

| | | | |
|---|---|---|---|
| 2,623,367 | 12/1952 | Morrison | 62/78 X |
| 3,208,641 | 9/1965 | Brugioni | 62/338 X |
| 3,526,320 | 9/1970 | Kryzer | 210/257.2 X |
| 4,626,346 | 12/1986 | Hall | 210/257.2 X |
| 4,724,079 | 2/1988 | Sale et al. | 210/754 X |
| 4,770,770 | 9/1988 | Regunathan et al. | 210/257.2 X |
| 4,810,388 | 3/1989 | Trasen | 210/257.2 X |
| 4,876,002 | 10/1989 | Marshall et al. | 210/257.2 X |
| 4,950,453 | 8/1990 | Murray | 210/745 X |

*Primary Examiner*—William E. Tapolcai
*Attorney, Agent, or Firm*—Notaro & Michalos

[57] ABSTRACT

A refrigerator is combined with a reverse osmosis water purification system so that purified water is available at an ice-maker and water tap forming part of the refrigerator. The water is also chlorinated upstream of the reverse osmosis filter and dechlorinated downstream thereof, before the water is supplied to a tank. Level and purity sensors are provided in the tank for cutting off the supply of water when the tank is full and for indicating the purified condition of the water.

19 Claims, 1 Drawing Sheet

REFRIGERATOR WITH PURIFIED WATER SUPPLY

FIELD AND BACKGROUND OF THE INVENTION

The present invention relates in general to refrigerators, and in particular to a new and useful refrigerator with purified water supply that can eliminate toxins, carcinogens and chemicals as well as microorganisms.

Modern refrigerators are known which include a tap for dispensing chilled water and which further include an ice maker for dispensing ice cubes or ice chips. See for example U.S. Pat. Nos. 3,834,178; 3,570,266; and 3,429,140.

A wide variety of water purification systems are also known for purifying water. The simplest of these systems is a particle filter which removes particles from the water. Water softening systems are also known.

A far more sophisticated system which has been available for some time is known as a reverse osmosis and ion exchange system. The reverse osmosis system removes dissolved solids in the water by passing the water over a membrane under pressure. Some of the water goes through the membrane, leaving the dissolved solids behind. The water with concentrated solids (brine) is piped away from the membrane to a drain. The purified water which has passed through the filter is then subjected to an ion exchange process for removing impurities which have passed through the filter to further purify the water.

In order to kill bacteria, virus and other micro organisms, it is well known to chlorinate city water. The chlorination of city water has its own hazards however since the chlorination of water has been linked to a higher incidence of cancer.

It is also known to remove chlorine from water using an activated charcoal filter.

Nothing in the prior art teaches the combination of a sophisticated water purification system with a refrigerator in order to supply chilled tap water and ice using the purified water rather than city water.

SUMMARY OF THE INVENTION

An object of the present invention is to combine a sophisticated water purification system with a refrigerator so that ice and tap water supplied by the refrigerator use purified water which is both pure and good tasting.

A further object of the present invention is to assemble the elements of a reverse osmosis and ion exchange filtration system into a refrigerator enclosure.

A still further object of the present invention is to provide a refrigerator with purified water supply, comprising: wall means for defining a refrigerated enclosure; refrigeration means connected to the wall means for refrigerating the enclosure; at least one door connected to the wall means for closing and opening the enclosure; an elongated reverse osmosis tube containing a semipermeable membrane, the tube being mounted to and extending along at least a portion of said wall means and having an inlet for receiving a supply of water, a waste water outlet for discharging water which has passed across one surface of the semi-permeable membrane, and a purified water outlet for discharging water which has passed through and been at least partly purified by the semi-permeable membrane; gross filtration means mounted to the wall means and having an inlet for receiving a supply of city water under pressure, and an outlet connected to the inlet of the reverse osmosis tube, for supplying water which has been subject to gross filtration to the inlet of the tube; a water supply tank connected to the purified water outlet of the reverse osmosis tube for receiving purified water from the tube, the tank being at least partly in heat transfer contact with the enclosure so that water in the tank is refrigerated; a water supply tap connected to the tank for discharging purified water to be used from the tank; a level sensor connected to the tank for the tank for sensing a full level for the tank; the gross filtration means, reverse osmosis tube and tank being connected along a water circuit for the supply of water therealong; and a valve connected to and activated by the level sensor for closing when the level sensor senses the full level of the tank, the valve being connected to the water circuit for opening and closing the passage of water therealong.

A still further object of the present invention is to mount all of the equipment forming the water purification system to a side wall of the refrigerator, which can be covered by a lid, for access and maintenance without disturbing the contents of the refrigerator enclosure.

DESCRIPTION OF THE PREFERRED EMBODIMENT

Figure 1:
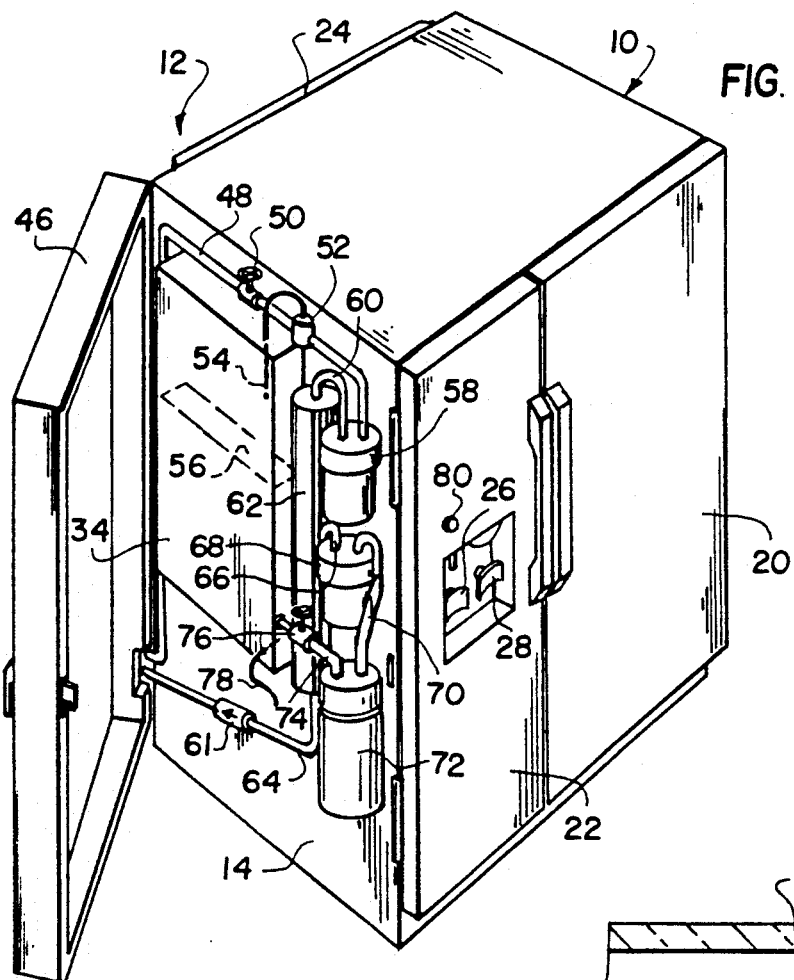
FIG. 1 is a perspective view of a refrigerator with purified water system according to the present invention.
Figure 2:
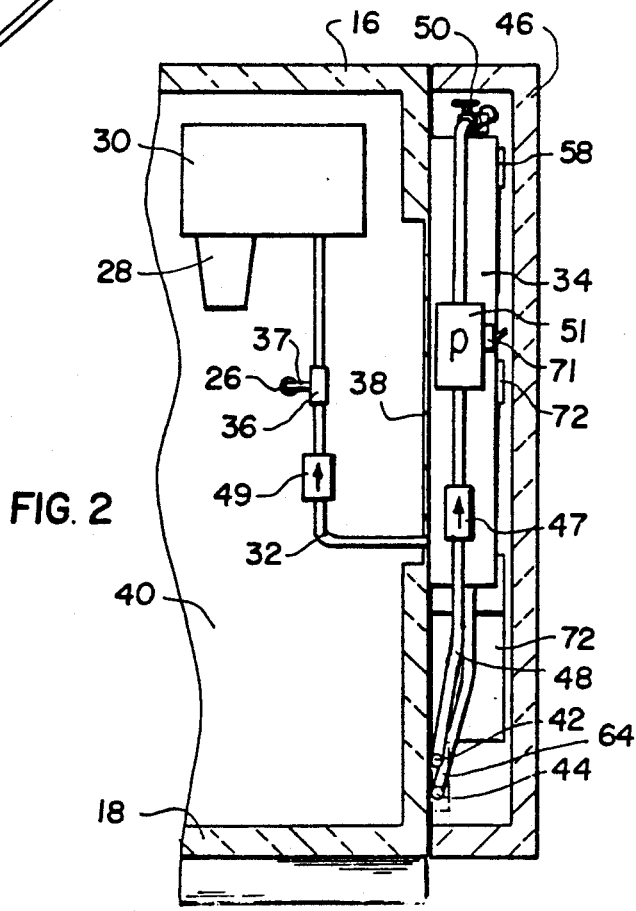
FIG. 2 is a partial rear sectional view of FIG. 1.

Referring to the drawings in particular, the invention embodied therein comprises a refrigerator generally designated 10 which has a water purification system generally designated 12 mounted to one side wall 14 thereof. The side wall 14 along with a top wall 16, a bottom wall 18, a rear wall and a pair of doors 20 and 22 are heavily insulated to produce a refrigerated enclosure which is chilled by refrigeration means of conventional design shown schematically at 24, mounted to the rear wall of the refrigerator. The narrower door 22 communicates with a freezer enclosure and contains a recess with a chilled water supply tap 26 and an ice cube or ice chip dispensing chute 28. As shown in FIG. 2, the chute 28 is fed by an ice maker 30 which receives a supply of water over a water line 32 from a pressurized tank 34 mounted to the side wall 14. A T-connection 36 separates a tap line 37 from the water supply line 32, which tap line supplies the water tap 26. The water lines to the tap and ice maker as well as the T-connection 36 are advantageously embedded within the side wall 14. The side wall 14 has its insulation partly removed in an area 38 so that the chilled air within the enclosure 40 is in heat transfer communication with the side wall of tank 34. In this way, the water within the tank is also chilled. Care must be taken to avoid making the wall at 28 too thin, to avoid freezing the water in tank 34. For this purpose, a thermostatic sensor can be provided in the tank to decrease the operating temperature of the freezer in case the water in the tank becomes too cold.

Water under city pressure is supplied at a water inlet 42 to the rear of the refrigerator and a drain 44 is also provided for draining water from the refrigerator.

The side mounted water purification system 12 is completely covered by an insulated lid 46 which is hinged to the outside of side wall 14.

City water entering inlet 42 is supplied on a water circuit having an inlet pipe 48 which contains a manual valve 50 and a solenoid valve 52. Solenoid valve 52 is open as long as a water level sensor 54 within tank 34 is above a water level 56 within the tank. When the water level rises to the sensor 54, this produces a signal which closes valve 52 and thus cuts off the supply of water along the water circuit.

Water along inlet line 48 first passes through a combination chlorination chamber and gross filter 58. The water is thus filtered of sand and other large particles and is simultaneously chlorinated. Chlorinated water is supplied over an inlet line 60 to the inlet of a reverse osmosis tube 62 containing a semipermeable membrane. Tube 62 is of known design and has a waste water outlet pipe 64 which is connected to the drain 44 through which most of the water (approximately 80%) is flushed along with impurities, from the tube 62. Some of the water (approximately 20%) passes through the semipermeable membrane and is purified to remove particles as small as 5 microns. The chlorine which remains in the water serves to kill all micro-organisms including bacteria and virus, and also maintains a clean condition for the semipermeable membrane which would otherwise deteriorate and be digested by the microorganisms. Water thus purified is discharged from the tube 62 along a purified water outlet pipe 66 and supplied to the inlet of an activated charcoal filter 68 which dechlorinates the water. The purified and dechlorinated water is supplied over a pipe 70 to the inlet of an ion exchange filter 72 which contains an ion exchange resin of known design properties. This serves to eliminate the remaining toxic substances such as PVC, other carcinogeus and other micron size molecules that have passed through the semipermeable membrane but which must still be removed from the water. The outlet of ion exchange filter 72 is connected to a purified water line 74 which contains pure water, some dissolved oxygen and some dissolved ozone- only The oxygen and ozone are necessary for good taste in the water. Pipe 74 contains a manual valve 76, and is connected to the tank 34 for filling the tank.

A purification sensor 78 is connected near the bottom of the tank and is electrically connected to a conductivity circuit and light 80. Since purified water is not highly conductive, the conductivity indicates the presence of ions which in turn represents impurities in the water. As long as a low level of ions remain (less than 5 parts per million or so) the electrical circuit keeps light 80 lit, indicating a pure condition. If light 80 is extinguished, this indicates the presence of impurities which in turn indicates that the system has somehow failed. In this event, lid 46 can be opened to provide easy access by exposing the system for maintenance. By mounting the filters 58, 68 and 72 near the front of the ,refrigerator 10 and under the lid 46, they can be easily cleaned and otherwise maintained. For this purpose, valves 50 and 76 are closed to isolate this section of the water circuit without interrupting the supply of water within the tank or the contents of the refrigerator.

Advantageously, tank 56 is of a thin rectangular structure which can be approximately 3 inches thick, 18 inches deep and 4 feet tall. Pressurization, if required, can be achieved using a diaphragm or other expansion and contraction mechanism within the tank. The tank can be strengthened by internal cross members and the like.

The side mounting of the water purification system also accommodates a vertically extending elongated (perhaps 3 feet) reverse osmosis tube 62.

To avoid possible back flow of water from the system of the invention to the water supply, a check valve 47 is provided in inlet pipe 48. This also guards against loss of pressure, if tank 37 is pressurized by city water pressure, in case there is a drop in city water pressure. Another check valve 61 is also provided in the outlet pipe 64 to avoid inadvertent drawing of waste water back into the system, in case there is a failure of pressurization in the system.

A check valve 49 is also provided in the line 32 which extends from the tank to the refrigerator water supply.

If tank 34 is not pressurized, or if the water supply for the invention is not under sufficient pressure, a positive pressure pump 51 may be provided in the inlet line, 48 for establishing flow of water into the tank 34 and into the outlets of the refrigerator. Pump 51 may be activated automatically through a pressure sensor or by a manual switch 71. Switch 71 may also be open to deactivate pump 51 in case there is sufficient city water pressure, in this case, the water simply passing through the pump.

Tank 34 may also be provided at an elevated position on the sidewall 14 or on the top wall of the refrigerator, with water being supplied from the tank through gravity.

While specific embodiments of the invention have been shown and described in detail to illustrate the application of the principles of the invention, it will be understood that the invention may be embodied otherwise without departing from such principles.

What is claimed is:

1. A refrigerator with purified water supply, comprising:

wall means for defining a refrigerated enclosure;

refrigeration means connected to the wall means for refrigerating the enclosure;

at least one door connected to the wall means for closing and opening the enclosure;

an elongated reverse osmosis tube containing a semipermeable membrane, said tube being mounted to and extending along an exterior of said well means, said tube having an inlet for receiving a supply of water, a waste water outlet for discharging water which has passed across one surface of the semipermeable membrane, and a purified water outlet for discharging water which has passed through and been at least partly purified by the semipermeable membrane;

gross filtration means mounted to an exterior of said wall means and having an inlet for receiving a supply of water under pressure, and an outlet connected to the inlet of said reverse osmosis tube, for supplying water which has been subject to gross filtration to the inlet of the tube;

a water supply tank connected to the purified water outlet of the reverse osmosis tube and extending along an exterior of said wall means for receiving purified water from the tube, said tank being at least partly in heat transfer contact with the enclosure so that water in the tank is refrigerated;

a water supply tap connected to said tank for discharging purified water to be used from said tank; and an ion exchange filter connected between said purified water outlet of said reverse osmosis tube, and said water supply tank, for removing ions from the water supplied from said tube to said tank, said ion exchange filter being mounted on an exterior of said wall means.

2. A system according to claim 1, including a level sensor connected to said tank for sensing a full level for said tank, said gross filtration means, reverse osmosis tube and tank being connected along a water circuit for the supply of water therealong, and a valve connected to and activated by said level sensor for closing when said level sensor senses a full level of the tank, said valve being connected to the water circuit for opening and closing the passage of water, said gross filtration system including a chlorination chamber for chlorinating the water which is supplied to said reverse osmosis tube, the system including a dechlorination filter connected between the purified water outlet of the tube and the storage tank.

3. A system according to claim 1, including a conductivity sensor connected to said tank for testing the conductivity of the water, and an indicator connected to the conductivity sensor for indicating the nonconductivity of the water, corresponding to a purified state of the water.

4. A system according to claim 1, wherein said wall means include a front wall at least partly covered by said at least one door and a pair of side walls, each on one side of said front wall, said elongated reverse osmosis tube and said gross filtration means being mounted on an exterior of at least one of said side walls.

5. A system according to claim 4, including a lid connected to said wall means for covering said reverse osmosis tube and said gross filtration means.

6. A system according to claim 5, wherein said water supply tank is mounted to an exterior of at least one of said side walls under said lid, said lid being insulated.

7. A system according to claim 6, wherein said gross filtration means is mounted adjacent said front wall for access to said gross filtration means for changing said gross filtration means.

8. A system according to claim 7, wherein said wall means are insulated, insulation in said side wall to which said tank is mounted being reduced in at least part of the area of said tank for establishing at least partial heat transfer contact between said tank and the enclosure.

9. A system according to claim 8, wherein said reverse osmosis tube extends vertically on said side wall, said gross filtration means extending adjacent said reverse osmosis tube.

10. A system according to claim 9, wherein said tank extends on said side wall on an opposite side of said reverse osmosis tube from said gross filtration means.

11. A system according to claim 1, wherein said wall means are insulated, said wall means including a front wall covered by said at least one door, and a side wall, said elongated reverse osmosis tube extending vertically on said side wall, said gross filtration means and said water supply tank also extending on said side wall.

12. A system according to claim 11, including an insulated lid movably connected to said wall means for extending over said side wall in a position covering said water supply tank, said gross filtration means and said elongated reverse osmosis tube.

13. A system according to claim 12, wherein insulation of said side wall over at least a portion of said water supply tank is reduced for allowing said at least partial heat transfer contact between the enclosure and said tank.

14. A system according to claim 1, wherein said wall means include a front wall at least partly covered by said at least one door and a pair of side walls, each on one side of said front wall, said elongated reverse osmosis tube, said ion exchange filter, and said gross filtration means being mounted on an exterior of at least one of said side walls, and ice making means in said enclosure and connected to said supply tap for making ice from purified water.

15. A system according to claim 14, including a lid connected to said wall means for covering said reverse osmosis tube and said gross filtration means.

16. A system according to claim 15, wherein said water supply tank is mounted to an exterior of at least one of said side walls under said lid, said lid being insulated.

17. A system according to claim 16, wherein said gross filtration mans is mounted adjacent said front wall for access to said gross filtration means for exchanging said gross filtration means.

18. A system according to claim 17, wherein said wall means are insulated, insulation in said side wall to which said tank is mounted being reduced in at least part of the area of said tank for establishing at least partial heat transfer contact between said tank and the enclosure.

19. A system according to claim 18, wherein said reverse osmosis tube extends vertically on said side wall, said gross filtration means extending adjacent said reverse osmosis tube.

* * * * *